United States Patent [19]
Nytomt et al.

[11] Patent Number: 5,992,386
[45] Date of Patent: Nov. 30, 1999

[54] METHOD FOR KNOCK CONTROL IN COMBUSTION ENGINES

[75] Inventors: Jan Nytomt; Peter Forsberg, both of Åmål, Sweden

[73] Assignee: Mecel AB, Sweden

[21] Appl. No.: 08/894,754

[22] PCT Filed: Dec. 20, 1996

[86] PCT No.: PCT/SE96/01744

§ 371 Date: Aug. 26, 1997

§ 102(e) Date: Aug. 26, 1997

[87] PCT Pub. No.: WO97/24527

PCT Pub. Date: Jul. 10, 1997

[30] Foreign Application Priority Data

Dec. 27, 1995 [SE] Sweden .................................. 9504659

[51] Int. Cl.[6] .................................................. F02P 5/152
[52] U.S. Cl. .............................. 123/406.37; 123/406.34; 123/406.38; 73/117.3
[58] Field of Search ...................... 123/406.37, 406.38, 123/406.33, 406.34; 73/35.08, 116, 117.3

[56] References Cited

U.S. PATENT DOCUMENTS

| | | | |
|---|---|---|---|
| 4,444,172 | 4/1984 | Sellmaier et al. | 73/35.08 |
| 4,648,367 | 3/1987 | Gillbrand et al. | 123/425 |
| 5,111,790 | 5/1992 | Grandy | 123/425 |
| 5,220,821 | 6/1993 | Moser et al. | 73/35 |
| 5,263,452 | 11/1993 | Ohsawa et al. | 123/425 |
| 5,425,339 | 6/1995 | Fukui | 123/435 |
| 5,743,233 | 4/1998 | Unland et al. | 123/406.37 |
| 5,769,049 | 6/1998 | Nytomt et al. | 123/435 |
| 5,803,047 | 9/1998 | Rask | 123/406.37 |
| 5,861,551 | 1/1999 | Morita et al. | 73/116 |

*Primary Examiner*—Willis R. Wolfe
*Assistant Examiner*—Hieu T. Vo
*Attorney, Agent, or Firm*—Ostrolenk, Faber, Gerb & Soffen, LLP

[57] ABSTRACT

A method for sorting out false indications of a knocking condition in combustion engines, and in a close loop manner influencing the control measures initiated in order to cease the knocking condition, which method includes obtaining an ionization signal characteristic of the ionization during a combustion with the aid of a gap biased by a measuring voltage and arranged in the combustion chamber. A knocking condition is detected from the determined intensity of the knock characteristic frequency content (KI) filtered out from the ionization signal. An integrated value (CQ) of the ionization signal is also used in order to influence knock control measures. Knock control measures are initiated at a first spontaneous knocking condition only if also the integrated value (CQ) from a combustion experiencing a knocking condition is increased in relation to a preceding non-knocking combustion ($CQ_{REF\_NORM}$). Further, the speed of return ($KT_{STEP}$, $Ign_{RET\_STEP}$) back to ideal basic control data is accelerated, dependent on the degree of reduction of the integrated value ($\Delta CQ_{REL}$), following a correction of basic control data initiated in order to cease the knocking condition.

12 Claims, 4 Drawing Sheets

METHOD FOR KNOCK CONTROL IN COMBUSTION ENGINES

BACKGROUND OF THE INVENTION

The present invention relates to a method for knock control in combustion.

Several knock detection methods for combustion engines are known.

Conventional methods use an accelerometer type of sensor, which sensor is mounted on the cylinder housing of the engine. By analyzing the frequency signal emitted from these sensors the typical frequencies for a knocking condition could be detected. When the intensity within the frequency range typical for a knocking conditions exceeds a certain level, then a knocking condition is established.

The disadvantage with this type of system is that other kind of vibrations, mechanical engine noise, road noise etc. , could have an impact upon the sensor output signal, and thus cause incorrect indications of a knocking condition.

In another method for knock detection a biased measuring gap is arranged within the combustion chamber. Ionization takes place within the combustion chamber during combustion, and the current developed in the measuring gap is representative for the combustion process. Similar to accelerometer type of sensors a knocking condition could be established by filtering out the superposed frequency in the ionization current typical for a knocking condition. This could be made using a system where the ordinary spark plug is used as the measuring gap, and where a substantially constant measuring voltage is applied in the grounded connection of the secondary winding of the ignition coil, as shown for example in EP,C,188.180 (=U.S. Pat. No. 4,648, 367).

Knock detection using frequency analysis of the ionization current has the advantage that knock detection is not affected by mechanical engine noise, and if the ordinary spark plug is used as the measuring gap then no additional sensor on the engine is needed. Different detailed solutions for ionization current detected knock are further shown in:

- U.S. Pat. No. 5,263,452, where the level of an extracted frequency component a certain time after ignition spark generation is used in order to establish a knocking condition;
- U.S. Pat. No. 5,005,547, where ignition timing control is initiated to find optimum timing, until a knocking condition is detected via ionization current; and
- U.S. Pat. No. 5,111,790, where the superposed frequency of the ionization current is detected in the primary winding of the ignition coil.

In U.S. Pat. No. 5,220,821 a method is shown where any ion current detected knock is ignored if the ion current amplitude is too low or is fluctuating. This sorting out of incorrect indications of a knocking condition, if based upon frequency analysis of the ionization current, is insensible for incorrect indications of a knocking condition developed during operating conditions when the ionization current in its normal state is stable and exceeds an acceptable signal level. This method could mainly sort out incorrect indications for a knocking condition during specific operating conditions when the ionization current is low or fluctuating, for example at low rpms and low load, respectively at other unstable operating conditions at lean or by EGR diluted air fuel mixtures.

SUMMARY OF THE INVENTION

An object of the invention is for combustion engines, where a knocking condition is detected via frequency analysis of the ionization current developed within the combustion chamber, to be able to control a combustion in an optimal manner. Another object is that when a knocking condition is detected ideal operating parameters should be recaptured as soon as possible, following an initiated correction of these ideal operating parameters dependent of a detected knocking condition.

Another object is to be able to sort out incorrect indications of a knocking condition in a larger part of the operating range of the combustion engine, where a knocking condition is detected by using frequency analysis of the ionization current developed within the combustion chamber.

Yet another object is to be able to control the knock preventive control measure in a feed-back manner, such that a return back to ideal basic control data, i.e. ignition timing/ fuel amount/charge air pressure, is obtained as soon as possible.

These and other objects are accomplished by a method which includes (a) obtaining an ionization signal representative of ionization within a combustion chamber of the combustion engine; (b) obtaining a characteristic frequency signal being dependent on the strength of the knocking condition; (c) integrating the ionization signal to obtain an integrated value from each combustion; and (d) correcting the basic control data to cease the knocking condition based on a combination of the intensity of the characteristic frequency signal and the amount of change of the integrated value from a previous value thereof.

By the inventive method which initiate a knock preventive control measure dependent of two characteristics of the ionization current both directly dependent of knock related phenomenon, an effective sorting out of incorrect indications of a knocking condition and feed-back information of the effect of the initiated control measure may be obtained.

Other features and advantages of the present invention will become apparent from the following description of the invention which refers to the accompanying drawings.

DESCRIPTION OF EXEMPLARY EMBODIMENTS

Figure 1:
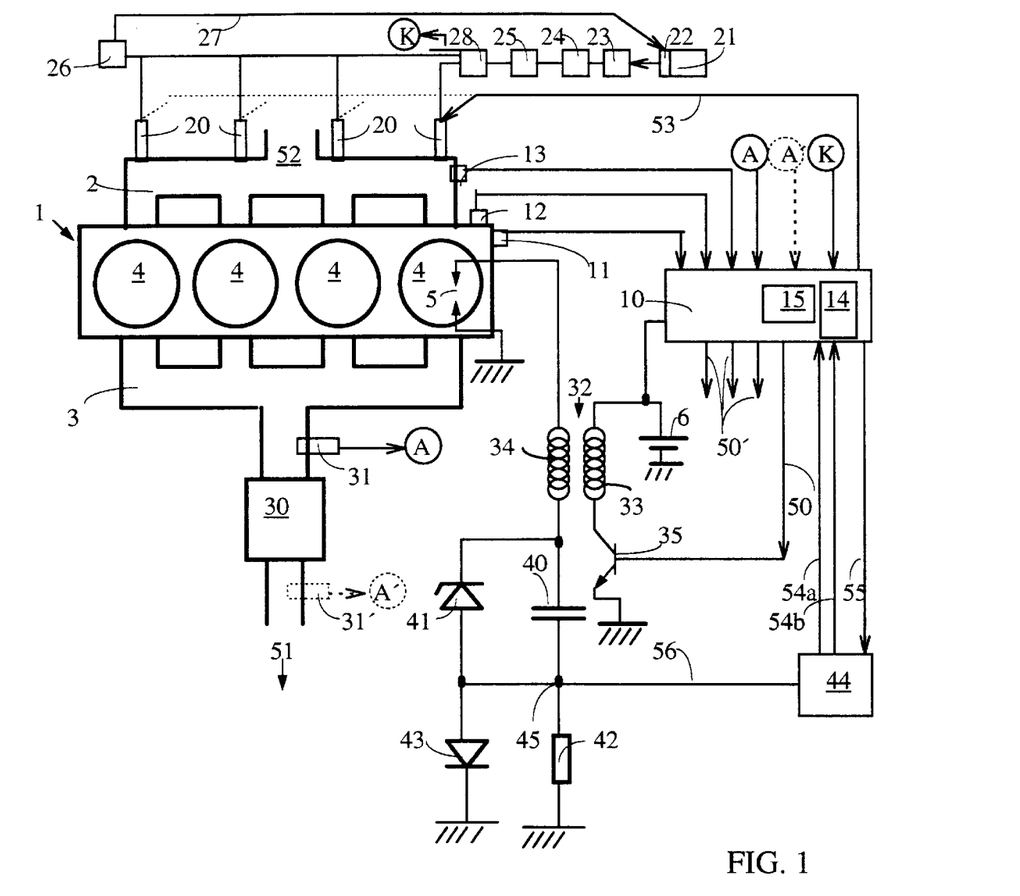
FIG. 1 shows schematically an arrangement for controlling a combustion engine and detection of the degree of ionization within the combustion chamber.

In FIG. 1 is shown an arrangement for controlling a combustion engine 1. A fully electronic control system for the fuel supply as well as ignition timing for the combustion engine is shown. A microcomputer 10 control the ignition timing as well as the amount of fuel supplied dependent of engine speed, engine temperature and load of engine, detected by the sensors 11,12,13 respectively.

The sensor 11 is preferably a conventional type of pulse-transmitter, detecting cogs at the outer periphery of the flywheel. A positioning signal could also be obtained by the sensor 11, by one or some cogs having varying tooth width, alternatively tooth gap, at a stationary crankshaft position.

The microcomputer 10 includes a customary type of arithmetic unit 15 and required memories 14, storing control algorithms, fuel maps and ignition timing maps. At least one spark plug 5 is arranged in each cylinder, only one spark plug intended for a cylinder shown in FIG. 1. The ignition voltage is generated in an ignition coil 32, having a primary winding 33 and a secondary winding 34. One end of the primary winding 33 is connected to a voltage source, a battery 6, and the other end is connected to ground via an electrically controlled switch 35.

A current starts to flow through the primary winding 33 when the control output 50 of the microcomputer 10 switches the switch 35 to a conductive state. When the current is cut out a step-up transformation of the ignition voltage will be obtained in the secondary winding 34 of the ignition coil 32 in a conventional manner, and an ignition spark will be generated in the spark gap 5.

Start and stop of the current flow, so called dwell-time control, is controlled dependent of the present parameters of the engine and according to a pre-stored ignition map in the memory 14 of the microcomputer. Dwell-time control controls that the primary current reach the level necessary and that the ignition spark is generated at the ignition timing necessary for the present load case.

One end of the secondary winding is connected to the spark plug 5, and the other end connected to ground includes a detector circuit detecting the degree of ionization within the combustion chamber. The detector circuit includes a voltage accumulator, here in the form of chargeable capacitor 40, which capacitor bias the spark gap of the ignition plug with a substantially constant measuring voltage. The capacitor is equivalent to the embodiment shown in EP,C, 188180, where the voltage accumulator is a step-up transformed voltage from the charging circuit of a capacitive type of ignition system. In the embodiment shown in FIG. 1, the capacitor 40 is charged when the ignition pulse is generated, to a voltage level given by the break-down voltage of the zener diode 41. This break-down voltage could lie in the interval between 80–400 volts. When the stepped up ignition voltage about 30–40 kvolts is generated in the secondary winding, the zener diode breaks down which assures that the capacitor 40 will not be charged to a higher voltage level than the break-down voltage of the zener diode. In parallel with the measuring resistance 42 is a protecting diode connected with reversed polarity, which in a corresponding manner protects against over voltages of reversed polarity. The current in the circuit 5-34-40/40-42-ground could be detected at the measuring resistance 42, which current is dependent of the conductivity of the combustion gases in the combustion chamber. The conductivity in turn is dependent of the degree of ionization within the combustion chamber.

By the measuring resistance 42 being connected close to ground only one connection to the measuring point 45 is necessary for the detector circuit 44. The detector circuit 44 measure the potential over the resistance 42 in measuring point 45 relative to ground. By analyzing the current, alternatively the voltage, through the measuring resistance among other conditions a knocking condition or preignition could be detected. As has been mentioned in U.S. Pat. No. 4,535,740 during certain operating cases the present air-fuel ratio could also be detected, by measuring how long the ionization current is above a certain level.

With a lambda sensor 31 arranged in the exhaust manifold of the combustion engine, as seen in the flow of exhaust upstream of a catalyst 30 arranged in the exhaust manifold, the residual amount of oxygen could be detected, and hence also the present mixture ratio of air-fuel. With a conventional narrow-banded lambda sensor, having an output signal with a distinct transition just below stoichiometric mixtures, the fuel amount given from a stored fuel map could be corrected. The correction is made in order to maintain the ideal mixture ratio of air-fuel for the function of the catalyst 30. By the output signal A from the lambda sensor a feed back control of the fuel supply could be obtained, which control is performed in such a way that the output signal from the lambda sensor oscillates between a high and a low output signal up to a couple of times per second.

The fuel supply system of the combustion engine includes in a conventional manner a fuel tank 21 having a fuel pump 22 arranged in the tank. The pressurized fuel is supplied from the pump 22 to a pressure equalizer 23, and further on to a fuel filter 24 and other containers 25, or volumes, including the fuel rail. A pressure regulator 26 is arranged at one end of the fuel rail, which at exceeding pressures opens for a return flow in the return line 27, back to the fuel tank 21 or the fuel pump 22. An alternative to a pressure regulator 26 opening at excessive pressures could be a pressure controlled fuel pump, whereby the return line 27 could be avoided. The accumulated volumes of the fuel pump unit 22, the pressure equalizer 23, the fuel filter 24 and other cavities or volumes 25, are of such order that operation for a couple of minutes could take place before a new type of fuel being fuelled to the tank reaches the fuel injectors 20. The fuel injectors 20 are preferably arranged in the inlet channel of each cylinder, and preferably operated sequentially in synchronism with the opening of the respective inlet valves of the cylinders. The amount of fuel supplied is determined by the length of the control pulse emitted by the microcomputer to the respective fuel injectors. The amount of fuel, as well as ignition timing, is controlled dependent of present engine parameters according to prestored fuel- and ignition timing maps contained in the memory 14 of the microcomputer. The fuel amount given by the map could possibly be corrected by the lambda sensor output.

In a certain type of fuel control system, a fuel quality sensor 28 could also be arranged in the fuel supply system. The fuel control could with a fuel quality sensor 28 be adjusted to the present octane number or mixture ratio of methanol and petrol. The control unit 10 could then obtain an input signal K from the fuel quality sensor, indicating the present fuel quality.

Figure 2:
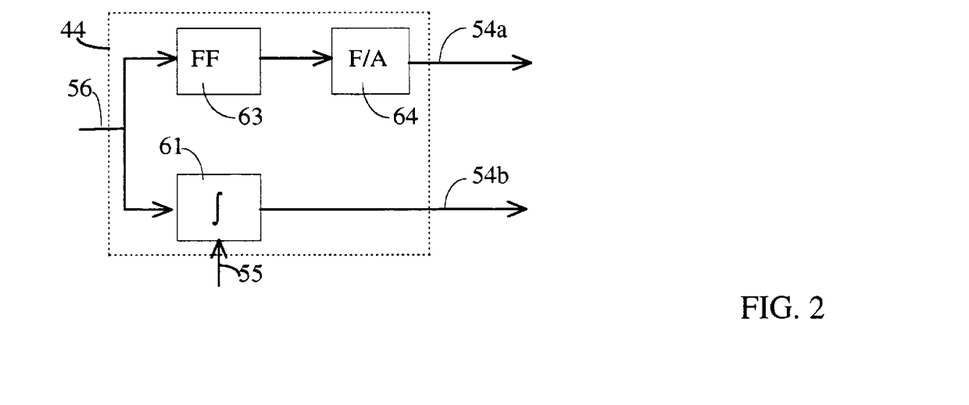
FIG. 2 shows schematically a first embodiment of an inventive controller.

In FIG. 2 is shown an inventive signal conditioning circuit of the detector circuit 44. The detector circuit 44 receives at line 56 a signal corresponding to the degree of ionization. This ionization signal is separately handled by two conditioning circuits connected in cascade.

In one of the conditioning circuits the ionization signal is integrated in a integrator 61. The integrated value thus formed is thereafter sent to the control unit 10 via signal line 54b. The integrator could be reset by the control unit 10 via signal line 55 before each combustion.

In the second conditioning circuit simultaneously the high frequency content of the ionization signal is filtered out in a band-pass filter 63, which high frequency content corresponds to the frequencies generated during a knocking condition, preferably exceeding 5 kHz. The frequency content representative for a knocking condition is subsequently passed over to a converter 64, which converts the frequency content to an analogue signal proportional to the intensity of the knocking condition. The converter 64, known per se, could preferably contain a rectifier, which rectifies the alternating voltage type of signal from the band-pass filter 63 and subsequently integrates the rectified signal in an integrator. The integrated signal thus formed will then be proportional to the superposed frequency content of the ionization signal, and the intensity of a knocking condition.

The second conditioning circuit sends a signal characteristic for the intensity of the knocking condition to the control unit 10 via signal line 54*a*.

Figure 3:
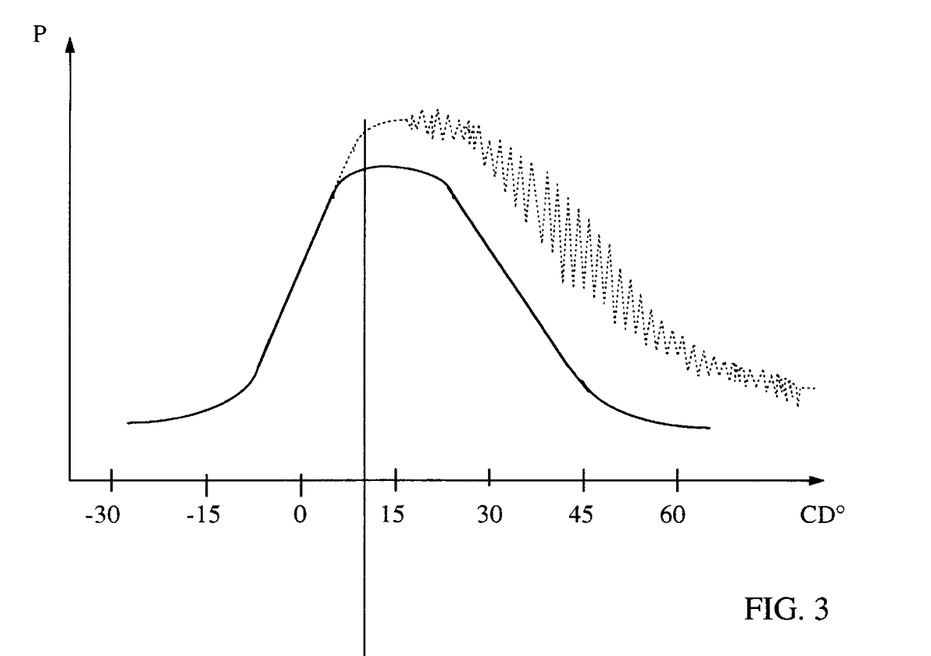
FIG. 3 shows the pressure within the combustion chamber during normal combustion and during combustion at knocking conditions.

In FIG. 3 is shown in an unbroken plot the combustion pressure P, as detected with a pressure sensor arranged within the combustion chamber, as a function of different crank angle degrees CD , during a normal combustion without knocking. With a broken plot is shown the combustion pressure as a function of different crank angle degrees during a knocking condition, but with all other parameters identical. It could be realized that the amplitude of pressure increases during knocking conditions.

Figure 4:
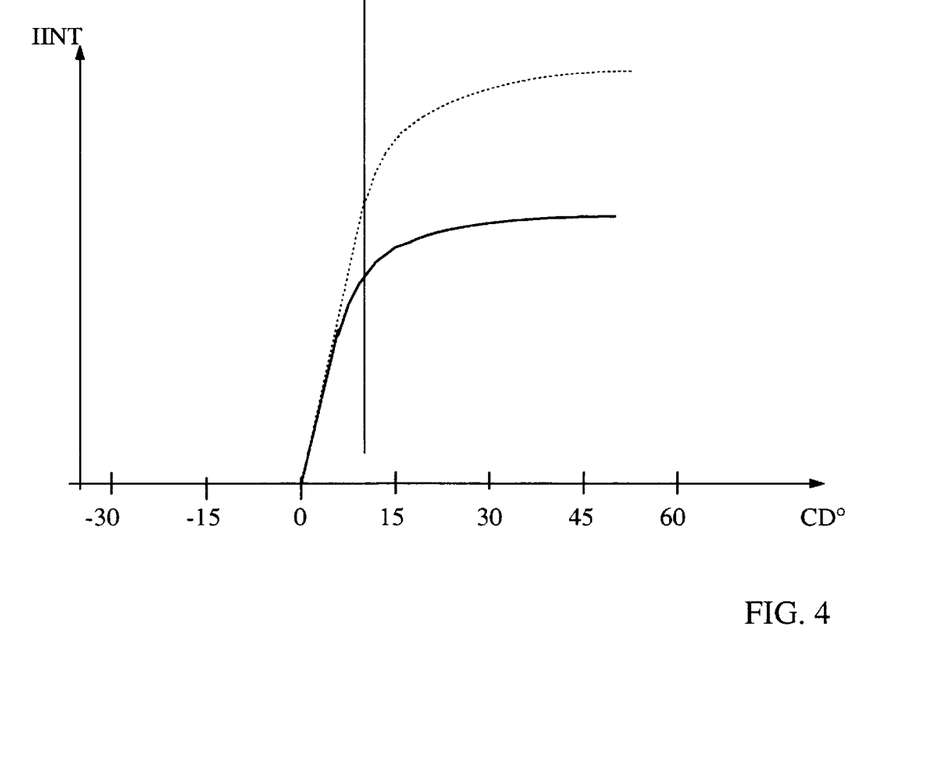
FIG. 4 shows how the integrated value of the ionization signal increases during normal combustion and during combustion at knocking conditions.

In FIG. 4 is shown how the integrated value of the ionization signal IINT increases during normal combustion, i.e. unbroken plot, and increases during a combustion with a knocking condition, i.e. broken plot. The integrated value of the ionization signal is established in a measuring window starting at upper dead center, where the crank angle correspond to 0 degrees. The degree of ionization within the combustion chamber increases with pressure as well as temperature. This will also cause an increase of the integrated value of the ionization signal during knocking condition. This phenomenon is used by the inventive method. If the value of the integrated value of the ionization signal does not increase during a first spontaneous knocking condition, as detected by the frequency analysis, then the knock indication is discarded.

An effect arising from a knocking condition is that the combustion chamber or exposed parts thereof are heated locally by the knocking condition, resulting in that subsequent combustions in the same combustion chamber could cause an increase of the ionization signal and the integrated value thereof, even though the knocking condition have ceased. The temperature of combustion residual gases, obtained from natural EGR and/or insufficient fresh air flow in two-stroke engines, could also increase following a knocking condition, which could increase the ionization signal. The degree of ionization increases with pressure as well as temperature within the cylinder.

The normal control measure during a knocking condition is a rapid retardation of the ignition timing, and maintaining the retarded ignition timing during a predetermined time interval or an engine speed dependent time interval, thus enabling arresting of the knocking condition and sufficient time for the combustion chamber to assume normal temperature.

Another alternative or complement is to increase the fuel amount, obtaining richer air fuel mixtures, to the knocking cylinder. In a corresponding manner this rich mixture is maintained during a predetermined time interval or an engine speed dependent time interval, thus enabling seizure of the knocking condition and sufficient time for the combustion chamber to assume normal temperature.

In supercharged engines the knocking condition could be counteracted by reduction of the charge pressure, but this affects all cylinders, even non knocking cylinders, if conventional types of superchargers are used. Also when charge pressure reduction is used to counteract a knocking condition, a certain predetermined time interval or engine speed dependent time interval is required for the control measure to be in effect.

A knocking condition could also be counteracted by injecting water into the combustion chamber, which method also could be used as a preventive measure at operating limits of the engine, often at maximum load and high speed.

According to the inventive method a return back to ideal basic control parameters could be initiated dependent of feed-back information from the ionization signal. When a correction of basic control parameters has been initiated the effect of the initiated control measure could be monitored by continuous monitoring of the changes in the integrated value of the ionization signal.

In a first embodiment the control unit 10 could store a reference value $CQ_{REF\_NORM}$ in memory 14, said reference value corresponding to an integrated value CQ from the latest non knocking combustion, i.e. when the intensity of the frequency content in the ionization signal did not exceed a predetermined level. This reference value could also correspond to an averaged value $CQ_{MEAN}$, formed from an average over some tens of consecutive non knocking combustions. At a detected first spontaneous knock event the integrated value of the ionization signal will increase in relation to this reference value. When basic control parameters have been changed dependent of the knocking condition, then the knock provoking condition is counteracted whereby the integrated value starts to decrease and approach the original reference value $CQ_{REF\_NORM}$. Once the integrated value CQ from subsequent combustions have been reduced to the reference $CQ_{REF\_NORM}$ or substantially corresponds to the reference, then ideal basic control parameters could be assumed immediately.

In a second embodiment the control unit 10 could store a reference value $CQ_{REF\_KNOCK}$ in memory 14, said reference value corresponding to an integrated value CQ from the combustion where a first and spontaneous knock occurred, i.e. when the intensity of the frequency content in the ionization signal did exceed a predetermined level. When basic control parameters have been changed dependent of the knocking condition, then the knock provoking condition is counteracted whereby the integrated value CQ starts to decrease below the reference value $CQ_{REF\_KNOCK}$. The order of incremental return step back to basic control parameter data could then be initiated dependent of the order of decrease of the integrated value between subsequent combustions.

One control measure initiated in order to cease a knocking condition could be retardation of the ignition timing when a knocking condition is detected. The ignition timing could be retarded a number of crankshaft degrees dependent of the knock intensity. Usually the ignition timing could be retarded 2–3 crank shaft degrees, when a first spontaneous knocking condition is detected. Thereafter this retarded ignition timing is maintained during an rpm-dependent time, or during a predetermined number of consecutive combustions, in order to cease the knocking condition effectively. Thereafter a successive return back to the ideal ignition timing will be initiated in incremental steps which are smaller than the control measure initiated when a knocking condition was detected. These incremental return steps could be in the order of one or some tenth of a crankshaft degree, and initiated after each combustion or after a predetermined number of consecutive combustions or a rpm dependent time.

In accordance with the inventive method the rpm-dependent time, during which the retarded ignition timing is maintained, could be influenced by the degree of decrease of the integrated value in comparison to the reference value $CQ_{REF\_KNOCK}$. This rpm-dependent time could be reduced proportionally to the reduction of the integrated value CQ, in relation to $CQ_{REF\_KNOCK}$, from succeeding consecutive combustions. In another alternative could also or instead the order of the incremental return-step increase proportional to the reduction of the integrated value CQ, in relation to $CQ_{REF\_KNOCK}$ from succeeding consecutive combustions.

Both these return routines will lead to that ideal basic control data are recaptured in a feed-back manner, using information on the effect of the control measure as controller for how fast these basic control data should be recaptured.

Figure 5:
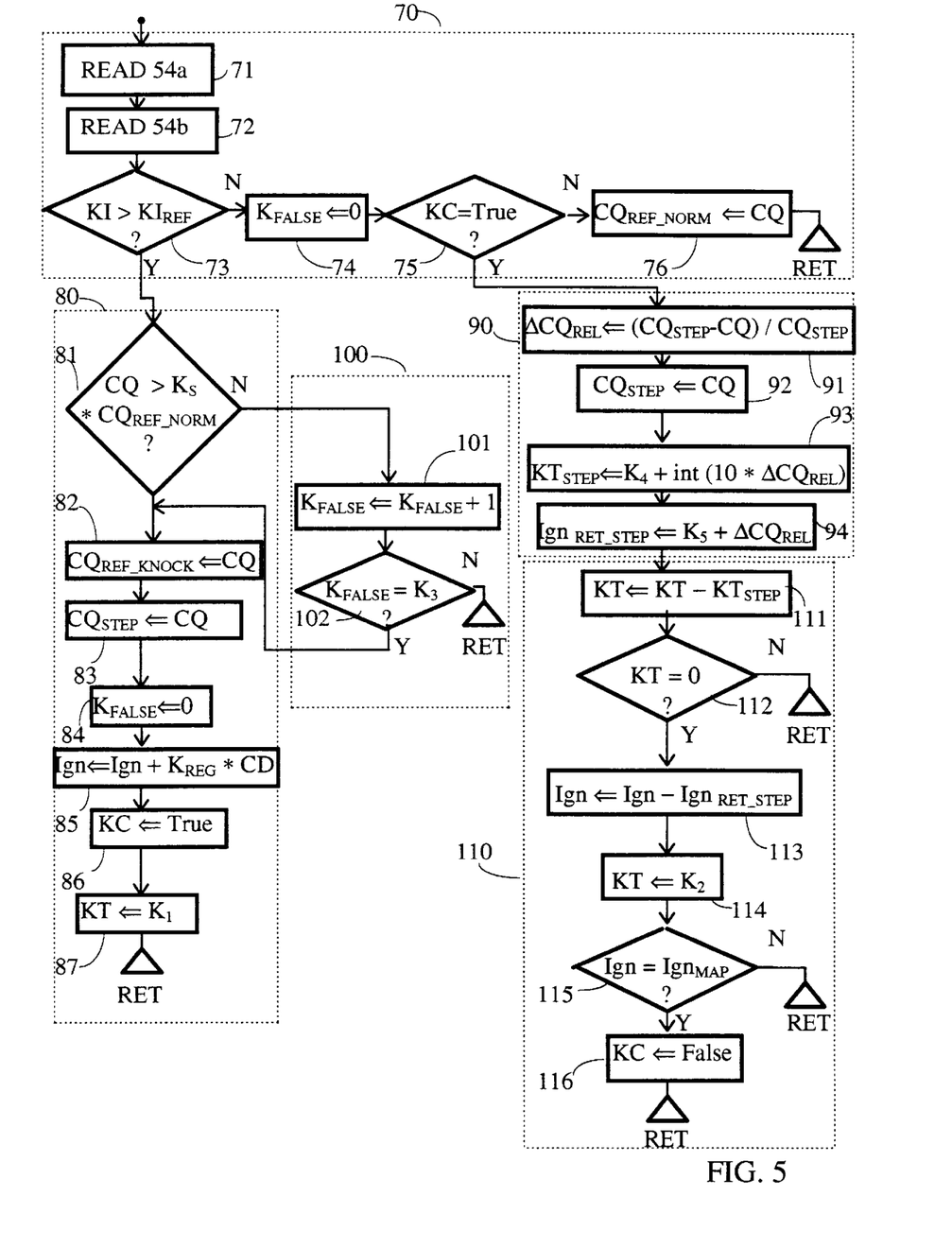
FIG. 5 shows a flow chart for an inventive control algorithm.

In FIG. 5 is shown a flow-chart for a knock controlling routine stored in the control unit 10. This routine is executed after each and every combustion. Section 70 of the flow-chart is always executed after each combustion as long as the intensity of the knock characteristic frequency is below a threshold and no correction of basic control data is initiated. In control steps 71 and 72, after each combustion the present values corresponding to knocking intensity, hereafter referred to as KI (Knock Intensity) and the present integrated value of the ionization signal, hereafter referred to as CQ (Combustion Quality) are sampled.

In control step 73 whether KI is above a predetermined reference level $KI_{REF}$ is detected. $KI_{REF}$ could be established from empirical tests where an audible knocking condition is about to be developed, and could be a mapped reference level for different operating cases, i.e. different combinations of load and rpm's. If KI is below the reference level $KI_{REF}$ then the routine proceeds to step 74 where a flag indicator (i.e. mode indicator) $K_{FALSE}$ is set to 0. Thereafter the routine proceeds to step 75 where a check is made if a knock control is initiated. An initiated knock control is indicated by the flag indicator KC set in a state "True". If ideal operating conditions are prevailing, when the flag indicator is set to a value "False", then the routine proceeds to step 76. In step 76 the reference value $CQ_{REF\_NORM}$ is established from the latest sampled value CQ, as sampled in step 72. The reference value $CQ_{REF\_NORM}$ could preferably be updated by some kind of averaging process. The most simple form of averaging could establish the new reference value only in parts from the most recent sampled value CQ. For example as;

$$CQ_{REF\_NORM}{}^{NEW}=0.1\ CQ+0.9\ CQ_{REF\_NORM}{}^{OLD},$$

i.e. that only 10% of the most resent CQ-value is allowed to have an impact upon the new reference value established.

After step 76 the routine will return to the main program, RET.

If instead KI should lie above the reference level $KI_{REF}$ in step 73, then the routine will proceed to section 80 in the flow-chart.

In a first step 81 in section 80 a control is made if a correct detection of a knocking condition has been made in step 73. A condition is also an increase of CQ during a knocking combustion. A reference $CQ_{REF\_NORM}$ is used, which is continuously updated in section 70 during normal combustion's. A safety factor $K_S$ could preferably be used, where the safety factor $K_S$ as an example could assume a value in the range 1.0–1.2. A true knocking condition normally causes an increase of the CQ value more than 20%, which is the reason for the safety factor assuming the higher value. If an increase of the CQ value is obtained, then the routine proceeds in steps 82–83–84. In step 82 the reference value CQREF_KNOCK is set to the latest sampled value CQ. In step 83 $CQ_{STEP}$ is set to the latest sampled value CQ. In step 84 the flag indicator $K_{FALSE}$ is set to 0.

After steps 82–84 the routine proceeds to step 85, where basic control parameters are corrected in order to cease the knocking condition. In this preferred embodiment the ignition timing Ign is retarded. The ignition timing Ign could be retarded a number of crankshaft degrees CD, preferably in the order of 2–4 crankshaft degrees if a fix control measure is desirable. In step 85 is also shown that a control factor $K_{REG}$ could be used. If a fixed control measure is desirable, then the control factor $K_{REG}$ is set to the value 1.0.

$K_{REG}$ could possibly be proportional to KI or a combination of KI and CQ. If $K_{REG}$ is proportional to KI, then the control measure could be initiated to a larger extent during heavy knocking, and to a smaller extent during moderate knocking.

After initiated correction of basic control parameters in step 85 the routine will proceed to step 86, where a flag indicator KC is set to "True". KC is a flag indicator indicative that a correction of basic control parameters is in progress, which flag indicator is set to "False" when corrected basic control parameters once have assumed values corresponding to basic control data given by mapped data. Correction of basic control data is terminated in step 87, where a counter KT is set to a value $K_1$, and then the routine returns to the main program.

In section 100 of the flow-chart, all combustions are handled which have indicated a knocking condition from the KI value, but without simultaneous increase of CQ. Steps 73 and 81 have been performed previously, before initiation of step 100 in section 100 of the flow chart. The flag indicator $K_{FALSE}$ is a parameter which during all other types of combustions is reset to a zero value in steps 74 and 84, respectively. In step 101 the value of the flag indicator is increased incrementally by a value of 1. This will lead to that if there are several consecutive combustions that will initiate section 100, then $K_{FALSE}$ is increased incrementally with the value 1 for each combustion. After step 101 the routine proceeds to step 102 where a check is initiated whether or not a predetermined number $K_3$ of consecutive combustions have occurred, said consecutive combustions having a KI indicated knocking condition but having a CQ indicated non-knocking condition. $K_3$ could be set to 2–5 combustion's. If a number of consecutive combustions with KI indicated knock, but CQ indicated non-knock, have occurred which number corresponding to $K_3$, then this safety routine could still initiate a correction of basic control data in steps 82–87.

In sections 90 and 110 return sequences back to normal basic control data are handled. During initiated correction of basic control data, then the flag indicator KC is set to "True" in step 86. If an initiated correction will lead to that KI does not indicate a knocking condition at the next subsequent combustion, then the routine will perform steps 71–74, and step 74 will initialize a return back to basic control data. In a first step 91 the decrease of the CQ value is calculated as compared with the preceding combustion. The reference parameter $CQ_{STEP}$ contains the CQ-value from a preceding knocking combustion, see step 83, or alternatively as described below in step 93 the CQ-value obtained from a preceding combustion during an initiated knock control procedure. The relative decrease $CQ_{REL}$ could be defined as;

$$CQ_{REL}=(CQ_{STEP}\ CQ)/CQ_{STEP}.$$

If the CQ value has decreased by 10%, then $CQ_{REL}$ will assume the value 0.1.

After due establishment of the relative decrease in step 91, then in step 92 $CQ_{STEP}$ is set to the present CQ-value, to be used in step 91 for the next succeeding combustion.

In step 93 the count down factor $KT_{STEP}$ is calculated, to be used for incremental count down of the counter KT after each combustion. The count down factor contain a constant $K_4$ as well as a factor which increase proportional to the decrease of the CQ-value between consecutive combustions.

The proportional factor could be obtained by multiplication $CQ_{REL}$ with a factor 10, and using the integer part of the sum obtained.

The routine will thereafter proceed to step 94, where the order of a return step $Ign_{RET\_STEP}$ of basic control data is calculated. The return step could in part include a constant $K_5$ and a part which increases proportional to the decrease of the CQ-value between consecutive combustions. The proportional part could correspond to $CQ_{REL}$. After having established the return step and count down factor dependent of the reduction of the CQ-value, then the routine proceeds to step 111. In step 111 a count down of the value contained in the counter KT is initiated incrementally with the count down factor $KT_{STEP}$, after which the routine proceeds to step 112 where a check is made if the counter has assumed a zero value. As long as the counter does not assume a zero value the latest order of correction of basic control data will be maintained, as initiated in step 85, or alternatively as described below in step 113.

For how long the initial correction should stay in effect is determined by the value $K_1$ as well as the order of the count down factor $KT_{STEP}$. If $K_1$ and $K_4$ assume the values 100 and 1, respectively, and the part proportional to decrease of CQ could be neglected, the initial correction will be maintained during 100 consecutive combustions, before the routine proceeds to step 113 and a return sequence back to basic control data is initiated. If instead the CQ-value should decrease more than 10% between a number of consecutive combustions, then the initial correction is maintained for a fewer number of combustion's.

When the counter KT reaches zero value the routine will proceed to step 113 where a return sequence back to basic control data, in this case ignition timing, is initiated using the return step $Ign_{RET\_STEP}$. The return step $Ign_{RET\_STEP}$ is usually only a fraction of the initial correction initiated in step 85.

$K_5$ could form a constant corresponding to some tenth of a crankshaft degree. If CQ decreases by 20% and $K_5$ is set to 0.1 crankshaft degrees, then a total return step in the order of 0.3 crankshaft degrees (0.1+0.2) will be obtained.

When the return sequence has been initiated in step 113, the routine will proceed to step 114, where the counter KT is set to a new value $K_2$. $K_2$ is preferably less than $K_1$, which will lead to that each return step is maintained a shorter period of time than the initial correction step.

In the next step 115 a check is made if basic control data is assumed. Here a detection is made if the current ignition timing corresponds to the ignition timing stored in the ignition map, i.e. an ignition timing not corrected due to a knocking condition. As long as basic control data is not recaptured, then the routine returns to the main program.

If instead the return sequence back to basic control data is completed, then the routine will proceed to step 116, where the flag indicator KC is set to "False", before returning to the main program.

Description of the flow-chart shown in FIG. 5 is based upon handling of a spontaneous type of a knocking condition. A spontaneous knocking condition is developed when the engine is controlled using ideal basic control data, given by maps. Repeated knocking, i.e. a number of consecutive combustion's experiencing a knocking condition or a knocking condition occurring before ideal basic control data is recaptured, may also arise. During a so called repeated knocking condition section 80 could be initiated once again, whereby the ignition timing could be retarded one step further.

In the flow-chart shown in FIG. 5 could also the ignition timing correction be substituted or complemented by fuel enrichment or reduction of charge pressure. The fuel amount and/or the charge pressure is increased or decreased using appropriate incremental fuel amounts or reduction levels.

If also an increase of the fuel amount should be initiated in step 85, then the current amount of fuel is increased a couple of percent. In step 94 could the return step consist of constant part, corresponding to a fraction of the fuel increases initiated in step 85, and a part which increase proportional to the decrease of the CQ-value. In a corresponding manner a fuel amount is obtained in step 113, and a comparative check with the fuel map is made in step 115.

If a reduction of the charge air pressure is implemented, then a substitution or addition is made in a corresponding manner in steps 85, 94, 113 and 115.

Figure 6:
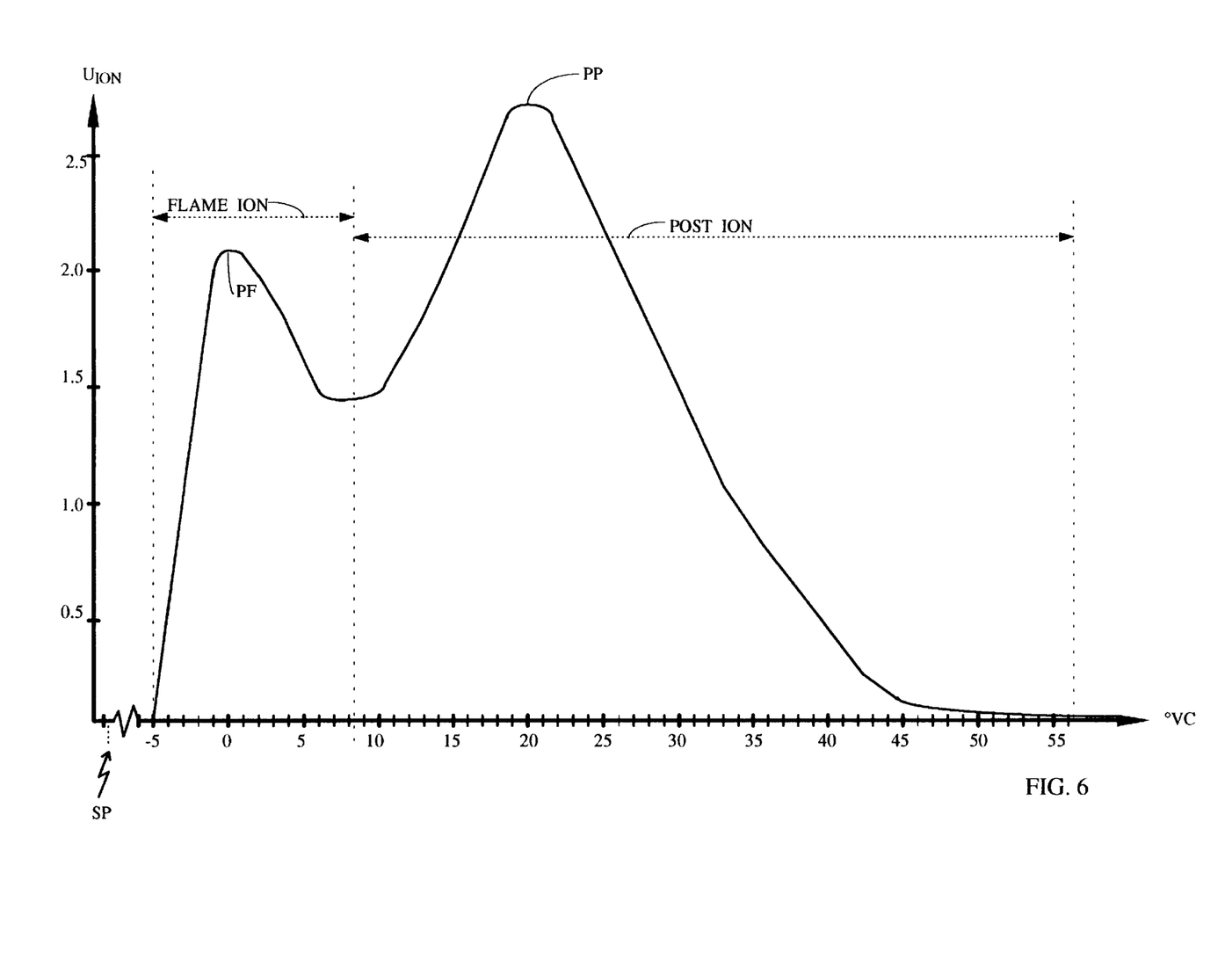
FIG. 6 shows a typical ionization signal, as detected with an arrangement shown in FIG. 1.

In FIG. 6 is schematically shown the signal $U_{ION}$ obtained at line 56, using a measuring arrangement according to FIG. 1. The level of $U_{ION}$ is plotted at the Y-axis, and in this case measured in volts, and could typically lie in the range 0–2.5 volts. At the X-axis is plotted crankshaft degrees, VC, where 0 correspond to upper dead position, i.e. when the piston is in its uppermost position. At the position SP, a position before upper dead position and typically 15–20 crankshaft degrees before upper dead position, the ignition spark is generated at the ignition timing advance suitable for current operating conditions of the engine, basically dependent of load and speed. The generation of spark induces a high pulse in the measuring circuit, caused by the flash over in the spark plug gap during the so called Break down phase. This high pulse is filtered out, and the measured value induced is not used in the preferred embodiment. Sampling of measured values is preferably controlled by the control unit 10, in such a manner that the control unit only sample the signal at lines 54a or 54b at certain determined positions or timings, i.e. during determined measuring windows. These measuring windows could be activated dependent of the spark timing SP, such that the measuring window opens a sufficiently long time interval after proper attenuation of the spark generation phase.

After the spark generation phase a flame ionization phase will commence, in FIG. 7 denoted FLAME ION, during which phase the measuring voltage is affected by the establishment of a burning kernel of the air fuel mixture within or close to the spark plug gap.

After the flame ionization phase a post ionization phase will commence, in FIG. 7 denoted POST ION, during which phase the measuring voltage is affected by the combustion within the combustion chamber, due to that the number of ionizing particles increases with temperature and pressure. POST ION reaches typically its maximum value, denoted PP in FIG. 7, when the combustion pressure reaches its maximum value and the flame front have reached the walls of the combustion chamber, which induces a pressure increase.

The current measuring window during which the ionization signal is integrated should be designed as wide as possible in order to obtain highest possible resolution. The measuring window should at least cover the entire post ionization phase, but preferably also the flame ionization phase or parts thereof. The activation of the measuring window could be controlled by the ignition timing, but should preferably be activated within the interval from −5 crankshaft degrees before upper dead position and until at least 40 crankshaft degrees after upper dead position. The measuring window could in certain type of applications be activated until 180 crankshaft degrees after upper dead position, i.e. until the piston reaches its lower dead position, in order to monitor extended post ionization phases caused by inferior fuel qualities or extremely diluted air fuel mixtures, which causes a slow burn rate in the combustion chamber.

The invention could within the scope of the claims be modified in a number of ways. Detection of knock does not necessarily have to be made using the ignition plugs of the combustion engine, as shown in FIG. 1. Detection of a knocking condition could also be made using a separate measuring gap.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

We claim:

1. A method for knock control of a combustion engine in which combustion is controlled by control of basic control data, which comprises the steps of:

(a) obtaining an ionization signal representative of ionization within a combustion chamber of the combustion engine;

(b) obtaining a characteristic frequency signal representative of a knocking condition from the ionization signal, the intensity of the characteristic frequency signal being dependent on the strength of the knocking condition;

(c) integrating the ionization signal to obtain an integrated value from each combustion; and (d) correcting the basic control data to cease the knocking condition based on a combination of the intensity of the characteristic frequency signal and the amount of change of the integrated value from a previous value thereof.

2. The method according to claim 1, wherein the ionization signal is integrated in a measuring window starting from after the discharge of an ignition spark in connection with an upper dead position of a piston within the combustion chamber, and closing not earlier than 40 crankshaft degrees after the upper dead position.

3. The method according to claim 2, wherein a measuring gap is used to obtain the ionization signal.

4. The method according to claim 2, wherein, when a spontaneous knocking condition is detected during a combustion, correction of basic control data is initiated only if the integrated value during said combustion simultaneously exhibits an increased value in relation to the integrated value from at least one preceding combustion.

5. The method according to claim 2, wherein the basic control data is corrected to cease the knocking condition, if the integrated value obtained from a combustion and the intensity of the characteristic frequency signal exceed respective predetermined levels.

6. The method according to claim 5, wherein the predetermined level of the integrated value is a level exceeding a threshold level by 10–15%, said threshold being obtained from at least one preceding combustion during which the intensity of the characteristic frequency signal is below its predetermined level.

7. The method according to claim 6, wherein a correction of basic control data is initiated in order to cease the knocking condition when: a repeated knocking condition is detected during a predetermined number of consecutive combustions; the intensity of the characteristic frequency signal is above the predetermined level thereof; and the integrated value is below the threshold level thereof.

8. The method according to claim 1, wherein the previous value of the integrated value is an average value thereof.

9. The method according to claim 1, wherein after initiation of a correcting of basic control data in order to cease the knocking condition, a change of the integrated value between consecutive combustions is used in order to control a return back to ideal basic control data.

10. The method according to claim 9, wherein the return back to ideal basic control data is initiated incrementally between combustions, where each incremental step of return is less than the control action initiated in order to cease the knocking condition.

11. The method according to claim 10, wherein correction of the basic control data results in a reduction of the integrated value, and the incremental steps of return are proportional to the reduction of the integrated value between consecutive combustions following an initiation of correction of basic control data.

12. The method according to claim 11, wherein the incremental steps of return back to ideal basic control data are initiated after a certain time, which time, at least in part, is reduced proportionally to the reduction of the integrated value between subsequent combustions after start of correction of basic control data.

* * * * *